(12) United States Patent
Xie et al.

(10) Patent No.: US 12,349,176 B2
(45) Date of Patent: Jul. 1, 2025

(54) DATA TRANSMISSION METHOD, NETWORK DEVICE AND SYSTEM IN MULTI-CONNECTIVITY NETWORK

(71) Applicant: CHINA TELECOM CORPORATION LIMITED, Beijing (CN)

(72) Inventors: Weiliang Xie, Beijing (CN); Xin Zhang, Beijing (CN); Jiangang Chen, Beijing (CN); Peng Li, Beijing (CN); Na Lu, Beijing (CN); Zhijun Li, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 336 days.

(21) Appl. No.: 17/926,394

(22) PCT Filed: May 7, 2021

(86) PCT No.: PCT/CN2021/091982
§ 371 (c)(1),
(2) Date: Nov. 18, 2022

(87) PCT Pub. No.: WO2021/238601
PCT Pub. Date: Dec. 2, 2021

(65) Prior Publication Data
US 2023/0189311 A1 Jun. 15, 2023

(30) Foreign Application Priority Data
May 29, 2020 (CN) .......................... 202010477384.1

(51) Int. Cl.
*H04W 72/50* (2023.01)
*H04L 5/00* (2006.01)
(Continued)

(52) U.S. Cl.
CPC ......... *H04W 72/535* (2023.01); *H04L 5/0035* (2013.01); *H04W 76/15* (2018.02); *H04W 88/06* (2013.01)

(58) Field of Classification Search
CPC ......... H04W 36/00698; H04W 36/385; H04W 76/15; H04W 76/16; H04W 76/19;
(Continued)

(56) References Cited

U.S. PATENT DOCUMENTS 5,315,636 A * 5/1994 Patel ....................... H04M 3/54
455/445
10,123,371 B2 * 11/2018 Li ........................... H04W 76/16
(Continued)

FOREIGN PATENT DOCUMENTS

| CN | 103582011 A | 2/2014 |
| CN | 104025645 A | 9/2014 |

(Continued)

OTHER PUBLICATIONS

Extended European Search Report issued in related EP Application No. 21814316.2 on Sep. 14, 2023; 7 pages.
(Continued)

*Primary Examiner* — William D Cumming
(74) *Attorney, Agent, or Firm* — Andrew M. Calderon; Calderon Safran & Wright P.C.

(57) ABSTRACT

A data transmission method, a network device and a system in a multi-connectivity network is provided. The method includes: determining a type of a user of a terminal; determining a user plane split policy corresponding to the terminal according to the type of the user of the terminal; and allocating a user plane channel of a first standard network of the construction operator to the terminal to transmit user plane data of the terminal, in a case that the user plane split policy corresponding to the terminal is split-disabled, and
(Continued)

allocating the user plane channel of the first standard network and a user plane channel of a second standard network of the construction operator to the terminal to transmit the user plane data of the terminal, in a case that the user plane split policy corresponding to the terminal is split-enabled.

20 Claims, 5 Drawing Sheets

(51) Int. Cl.
*H04W 76/15* (2018.01)
*H04W 88/06* (2009.01)

(58) Field of Classification Search
CPC . H04W 76/20; H04W 28/0865; H04W 28/24; H04W 88/06; H04W 8/18; H04W 36/0016
USPC ............................................... 455/445
See application file for complete search history.

(56) References Cited

U.S. PATENT DOCUMENTS

| | | | |
|---|---|---|---|
| 10,555,358 B2 * | 2/2020 | Li | H04W 76/16 |
| 10,638,376 B2 * | 4/2020 | Hahn | H04W 36/0016 |
| 10,999,882 B2 * | 5/2021 | Horn | H04W 28/24 |
| 11,222,298 B2 * | 1/2022 | Abelow | G06Q 10/067 |
| 11,296,978 B2 * | 4/2022 | Bangalore Krishnamurthy | H04L 12/4641 |
| 11,783,427 B1 * | 10/2023 | Yoder | G06Q 40/08 705/4 |
| 12,052,340 B2 * | 7/2024 | Samid | B01F 31/40 |
| 2013/0155849 A1 | 6/2013 | Koodli et al. | |
| 2015/0139184 A1 | 5/2015 | Wang et al. | |
| 2015/0289270 A1 | 10/2015 | Knapp et al. | |
| 2017/0099625 A1 * | 4/2017 | Li | H04W 36/00698 |
| 2018/0242383 A1 * | 8/2018 | Horn | H04W 76/15 |
| 2019/0059125 A1 * | 2/2019 | Li | H04W 28/0865 |
| 2020/0389823 A1 | 12/2020 | Xu et al. | |
| 2021/0248209 A1 * | 8/2021 | Yang | G06Q 50/184 |
| 2021/0345161 A1 * | 11/2021 | Zhu | H04W 88/06 |
| 2022/0132381 A1 * | 4/2022 | Novlan | H04W 76/20 |
| 2022/0174760 A1 * | 6/2022 | Xu | H04W 76/30 |
| 2023/0180066 A1 * | 6/2023 | Xie | H04W 8/18 370/331 |
| 2023/0189311 A1 * | 6/2023 | Xie | H04L 47/808 370/329 |
| 2024/0015002 A1 * | 1/2024 | Samid | B01F 31/40 |
| 2024/0172037 A1 * | 5/2024 | Srivastava | H04W 28/0268 |
| 2024/0187977 A1 * | 6/2024 | Chong | H04W 76/11 |

FOREIGN PATENT DOCUMENTS

| | | | | |
|---|---|---|---|---|
| CN | 104144511 | A | 11/2014 | |
| CN | 105472659 | A | 4/2016 | |
| CN | 105493555 | A | 4/2016 | |
| CN | 105519167 | A | 4/2016 | |
| CN | 106134139 | A | 11/2016 | |
| CN | 107734511 | | 2/2018 | |
| CN | 108207010 | A | 6/2018 | |
| CN | 108617020 | A | 10/2018 | |
| CN | 108617028 | A | 10/2018 | |
| CN | 110225553 | A | 9/2019 | |
| CN | 110536477 | A | 12/2019 | |
| CN | 110890967 | A | 3/2020 | |
| CN | 110972204 | A | 4/2020 | |
| CN | 111083688 | A | 4/2020 | |
| CN | 111182609 | A | 5/2020 | |
| CN | 111885656 | A | 11/2020 | |
| EP | 3 007 516 | A1 | 4/2016 | |
| EP | 3 562 193 | A1 | 10/2019 | |
| WO | WO-0205572 | A2 * | 1/2002 | ............ H04W 76/12 |
| WO | 2014022995 | A1 | 2/2014 | |
| WO | 2014/181181 | A1 | 11/2014 | |
| WO | 2018/09360 | A1 | 5/2018 | |
| WO | 2018/182240 | A1 | 10/2018 | |
| WO | WO-2018205094 | A1 * | 11/2018 | ............ H04M 15/66 |
| WO | 2019193237 | | 10/2019 | |
| WO | 2020/060852 | A1 | 3/2020 | |
| WO | WO-2023192322 | A1 * | 10/2023 | ............ H04W 24/02 |
| WO | WO-2024114354 | A1 * | 6/2024 | |

OTHER PUBLICATIONS

Anonymous, "3rd Generation Partnership Project; Technical Specification Group Services and System Aspects' Network Sharing; Architecture and functional description (Release 15)", 3GPP TS 23.251 V15.1.0 Sep. 2018, 17 Pages.
Japanese Office Action dated May 15, 2024 in JP Application No. 2022-573467, with English Translation, 9 pages.
First Office Action for Chinese Application No. 202010477384.1 dated Mar. 30, 2022, with English Translation, 31 pages.
Second Office Action for Chinese Application No. 202010477384.1 dated Sep. 7, 2022, with English Translation, 16 pages.
PCT/CN2021/091982 PCT ISR Dated Jul. 27, 2021 in Chinese, 4 pages.
PCT/CN2021/091982 PCT ISR Dated Jul. 21, 2021 in Chinese 3 pages.
PCT/CN2021/091982 PCT International Preliminary Report on Patentability, Written Opinion of the International Searching Authority, dated Nov. 17, 2022, in English, 4 pages.
PCT/CN2021/091987 PCT ISR Dated Jul. 27, 2021 in Chinese, 4 pages.
PCT/CN2021/091987 PCT ISR Dated Jul. 20, 2021 in Chinese, 5 pages.
PCT/CN2021/091987 PCT International Preliminary Report on Patentability, Written Opinion of the International Searching Authority dated Nov. 17, 2022, in English, 6 pages.
R3-200240, 3GPP TSG-RAN WG3 Meeting #107-e, E-Meeting, Feb. 24-Mar. 6, 2020, 3 pages.
Xiao et al. Research on 5G Co-construction and Sharing Technology, 1994-2020 China Academic Journal Electronic Publishing House, http://www.cnki.net, 4 pages.
Zhang Zhirongl et al, Research on 5G network co-construction and sharing technology[J]. Application of Electronic Technique, 2020, 46(4): 1-5, 7 pages.
3GPP TR 38.801 V2.0.0 (Mar. 2017) Technical Report, 3rd Generation Partnership Project; Technical Specification Group Radio Access Network; Study on New Radio Access Technology; Radio Access Architecture and Interfaces (Release 14), 90 pages.
Claudia D. Van Borkulo et al., A new method for constructing networks from Binary data, Scientific Reports, 4: 5918, DOI: 10.1038/srep05918, 10 pages.

* cited by examiner

DATA TRANSMISSION METHOD, NETWORK DEVICE AND SYSTEM IN MULTI-CONNECTIVITY NETWORK

CROSS-REFERENCE TO RELATED APPLICATIONS

The present disclosure is a U.S. National Stage Application under 35 U.S.C. § 371 of International Patent Application No. PCT/CN2021/091982, filed on May 7, 2021, which is based on and claims priority of Chinese application for invention No. 202010477384.1 filed on May 29, 2020, the disclosures of both of which are hereby incorporated into this disclosure by reference in its entirety.

TECHNICAL FIELD

The present disclosure relates to the field of communication technologies, and in particular, to a data transmission method, network device and system in a multi-connectivity network.

BACKGROUND

With a rapid development of the mobile Internet, users have gradually increased requirements for the network rate. In order to meet users' requirements for business rate, the 5G (5th Generation) mobile network has been implemented and deployed. With the implementation of 5G networks, at present, there are a plurality of standards of mobile communication networks, such as 5G networks, 4G (4th Generation) mobile networks, and 3G (3th Generation) mobile networks, etc. In a mobile network environment where mobile networks of different standards coexist, a multi-connectivity technology enables a user terminal to aggregate business rates of mobile networks of different standards to increase a transmission rate, thereby improving a user's business experience in a multi-connectivity network.

In the multi-connectivity network comprising a core network and an access network, the access network generally adopts a network architecture in which a control plane and a user plane are separated from each other. For example, in a NSA (Non-Standalone) scenario of 5G, Option 3, 4, 7, and 8 have been proposed for 3GPP (3rd Generation Partnership Project), which enable a terminal to establish a connection with a 4G base station and a connection with a 5G base station at the same time (dual-connectivity). At present, a mainstream networking mode is Option 3. Because a deployment frequency of a 4G base station is lower than that of a 5G base station, a coverage of the 4G base station is larger than that of the 5G base station. Therefore, in Option 3, the 4G base station is responsible for a transmission of control plane information, while the 5G base station and the 4G base station are together responsible for a transmission of user plane data through a dual-connectivity technology, so as to achieve a purpose of aggregating performances of the 4G and 5G networks.

According to three specific implementations comprised in Option 3, the user plane data of a terminal can be transmitted in three manners. As shown in FIG. 1, Option 3 specifically comprises: Option3, Option3a, and Option3x, in which the transmission of the control plane information is shown by dotted arrows, and the transmission of the user plane data is shown by solid arrows. In Option3, the user plane data of the terminal is split to the 5G base station through the 4G base station; in Option3a, the user plane data of the terminal is split to the 4G base station and the 5G base station through the core network (EPC, Evolved Packet Core network); In Option3x, the user plane data of the terminal is split to the 4G base station through the 5G base station. Protocol stacks of the 4G and 5G base stations comprise, for example, a PDCP (Packet Data Convergence Protocol) layer, a RLC (Radio Link Control) layer, and a MAC (Media Access Control) layer, a PHY (Physical) layer, etc. Both the 4G base station and the 5G base station are connected to the EPC (Evolved Packet Core). The 4G base station is, for example, an LTE (Long Term Evolution) base station, and the 5G base station is, for example, an NR (New Radio) base station.

At present, due to a high cost of constructing 5G networks, it is desired to co-construct and share the 5G networks by multiple operators in different regions to save investments of the 5G networks. 5G users of various sharing operators can use the 5G networks constructed by different operators. For example, in a network co-construction and sharing mode, infrastructures of the 5G networks can be set up by operator A in some cities, by operator B in other cities, and by operator C in further cities. In the NSA scenario, the 4G base station is generally an anchor of the 5G base station. Therefore, a local construction operator shares the control plane of the 4G network with other operators, so that users of other sharing operators can access the NSA network.

SUMMARY

According to some embodiments of the present disclosure, a data transmission method in a multi-connectivity network is provided, comprising: determining a type of a user of a terminal during a process of the terminal accessing a multi-connectivity network of the construction operator, wherein the type comprises a first type indicating that the user is a user of a sharing operator or a second type indicating that the user is a user of the construction operator; determining a user plane split policy corresponding to the terminal according to the type of the user of the terminal; and allocating a user plane channel of a first standard network of the construction operator to the terminal to transmit user plane data of the terminal, in a case that the user plane split policy corresponding to the terminal is split-disabled, and allocating the user plane channel of the first standard network and a user plane channel of a second standard network of the construction operator to the terminal to transmit the user plane data of the terminal, in a case that the user plane split policy corresponding to the terminal is split-enabled.

In some embodiments, determining the user plane split policy corresponding to the terminal according to the type of the user of the terminal comprises: determining that the user plane split policy corresponding to the terminal is split-disabled, in a case that the type of the user of the terminal is the first type; and determining that the user plane split policy corresponding to the terminal is split-enabled, in a case that the type of the user of the terminal is the second type.

In some embodiments, determining the user plane split policy corresponding to the terminal according to the type of the user of the terminal comprises: determining the user plane split policy corresponding to the terminal, according to the type of the user of the terminal and an occupancy rate of user plane air interface resources provided by a base station in the second standard network and occupied by all terminals, of which users are of the same type as the terminal, in a case that a networking mode comprises splitting user plane data from the base station in the second standard network or splitting user plane data from a base station in the first standard network.

In some embodiments, determining the user plane split policy corresponding to the terminal, according to the type of the user of the terminal and the occupancy rate of the user plane air interface resources provided by the base station in the second standard network and occupied by all terminals, of which users are of the same type as the terminal comprises: determining whether the occupancy rate of the user plane air interface resources provided by the base station in the second standard network and occupied by all terminals belonging to users of the sharing operator reaches a threshold, in a case that the type of the user of the terminal is the first type, determining that the user plane split policy corresponding to the terminal is split-disabled, in a case that the occupancy rate reaches the threshold, and determining that the user plane split policy corresponding to the terminal is split-enabled, in a case that the occupancy rate does not reach the threshold; and determining that the user plane split policy corresponding to the terminal is split-enabled, in a case that the type of the user of the terminal is the second type.

In some embodiments, the method further comprises: after determining the user plane split policy corresponding to the terminal, storing the user plane split policy corresponding to the terminal in association with identification information of the terminal.

In some embodiments, storing the user plane split policy corresponding to the terminal in association with the identification information of the terminal comprises: setting a split switch of a user plane channel of the second standard network corresponding to the identification information of the terminal to an off state, in a case of determining that the user plane split policy corresponding to the terminal is split-disabled; and setting the split switch of the user plane channel of the second standard network corresponding to the identification information of the terminal to an on state, in a case of determining that the user plane split policy corresponding to the terminal is split-enabled.

In some embodiments, determining the type of the user of the terminal comprises: Obtaining identification information of the terminal from control plane information, in response to receiving the control plane information of the terminal; and determining the type of the user of the terminal according to the identification information of the terminal.

In some embodiments, determining the type of the user of the terminal comprises: obtaining a Public Land Mobile Network (PLMN) number of the terminal through a Radio Resource Control (RRC) connection establishment process with the terminal; and determining the type of the user of the terminal according to the PLMN number.

In some embodiments, the method further comprises: transmitting control plane information of the terminal through a control plane channel of the second standard network of the construction operator.

In some embodiments, the split switch is set at a base station in the second standard network, in a case that a networking mode comprises splitting user plane data from the base station in the second standard network or splitting user plane data from a base station in the first standard network, and the split switch is set at a core network device, in a case that the networking mode comprises splitting user plane data from the core network of the second standard network.

In some embodiments, the first standard network is a Fifth-Generation mobile network, and the second standard network is a Fourth-Generation mobile network or a Third-Generation mobile network.

According to still other embodiments of the present disclosure, a network device in a multi-connectivity network is provided, comprising: a processor; a memory coupled to the processor and storing instructions that when executed by the processor, cause the processor to: determine a type of a user of a terminal during a process of the terminal accessing a multi-connectivity network of the construction operator, wherein the type comprises a first type indicating that the user is a user of a sharing operator or a second type indicating that the user is a user of the construction operator; determine a user plane split policy corresponding to the terminal according to the type of the user of the terminal; and allocate a user plane channel of a first standard network of the construction operator to the terminal to transmit user plane data of the terminal, in a case that the user plane split policy corresponding to the terminal is split-disabled, and allocate the user plane channel of the first standard network and a user plane channel of a second standard network of the construction operator to the terminal to transmit the user plane data of the terminal, in a case that the user plane split policy corresponding to the terminal is split-enabled.

In some embodiments, determining the user plane split policy corresponding to the terminal according to the type of the user of the terminal comprises: determining that the user plane split policy corresponding to the terminal is split-disabled, in a case that the type of the user of the terminal is the first type; and determining that the user plane split policy corresponding to the terminal is split-enabled, in a case that the type of the user of the terminal is the second type.

In some embodiments, determining the user plane split policy corresponding to the terminal according to the type of the user of the terminal comprises: determining the user plane split policy corresponding to the terminal, according to the type of the user of the terminal and an occupancy rate of user plane air interface resources provided by a base station in the second standard network and occupied by all terminals, of which users are of the same type as the terminal, in a case that a networking mode comprises splitting user plane data from the base station in the second standard network or splitting user plane data from a base station in the first standard network.

In some embodiments, determining the user plane split policy corresponding to the terminal, according to the type of the user of the terminal and the occupancy rate of the user plane air interface resources provided by the base station in the second standard network and occupied by all terminals, of which users are of the same type as the terminal comprises: determining whether the occupancy rate of the user plane air interface resources provided by the base station in the second standard network and occupied by all terminals belonging to users of the sharing operator reaches a threshold, in a case that the type of the user of the terminal is the first type, determining that the user plane split policy corresponding to the terminal is split-disabled, in a case that the occupancy rate reaches the threshold, and determining that the user plane split policy corresponding to the terminal is split-enabled, in a case that the occupancy rate does not reach the threshold; and determining that the user plane split policy corresponding to the terminal is split-enabled, in a case that the type of the user of the terminal is the second type.

In some embodiments, the memory further storing computer programs, when executed by a processor, cause the processor to store the user plane split policy corresponding to the terminal in association with identification information of the terminal to the memory.

In some embodiments, storing the user plane split policy corresponding to the terminal in association with identification information of the terminal to the memory comprises: setting a split switch of a user plane channel of the second standard network corresponding to the identification information of the terminal in the memory to an off state, in a case of determining that the user plane split policy corresponding to the terminal is split-disabled; and setting the split switch of the user plane channel of the second standard network corresponding to the identification information of the terminal in the memory to an on state, in a case of determining that the user plane split policy corresponding to the terminal is split-enabled.

In some embodiment, determining the type of the user of the terminal comprises: obtaining identification information of the terminal from control plane information, in response to receiving the control plane information of the terminal; and determining the type of the user of the terminal according to the identification information of the terminal.

According to still other embodiments of the present disclosure, there is provided a non-transitory computer-readable storage medium storing computer programs, when executed by a processor, cause the processor to: determine a type of a user of a terminal during a process of the terminal accessing a multi-connectivity network of the construction operator, wherein the type comprises a first type indicating that the user is a user of a sharing operator or a second type indicating that the user is a user of the construction operator; determine a user plane split policy corresponding to the terminal according to the type of the user of the terminal; and allocate a user plane channel of a first standard network of the construction operator to the terminal to transmit user plane data of the terminal, in a case that the user plane split policy corresponding to the terminal is split-disabled, and allocate the user plane channel of the first standard network and a user plane channel of a second standard network of the construction operator to the terminal to transmit the user plane data of the terminal, in a case that the user plane split policy corresponding to the terminal is split-enabled.

According to still other embodiments of the present disclosure, a data transmission system in a multi-connectivity network is provided, comprising: a network device in a multi-connectivity network according to any of the foregoing embodiments; and a terminal configured to access the multi-connectivity network of the construction operator, transmit the user plane data through the user plane channel of the first standard network of the construction operator, in a case that the user plane split policy corresponding to the terminal is split-disabled, and transmit the user plane data through the user plane channel of the first standard network and the user plane channel of the second standard network of the construction operator, in a case that the user plane split policy corresponding to the terminal is split-enabled.

Other features and advantages of the present invention will become apparent from the following detailed description of exemplary embodiments of the present disclosure with reference to the accompanying drawings.

BRIEF DESCRIPTION OF THE DRAWINGS

The accompanying drawings, which are comprised to provide a further understanding of the present disclosure and are incorporated in and constitute a part of this specification, illustrate embodiments of the invention, and together with the illustrative embodiments of the present application serve to explain the present disclosure, but are not limitation thereof.

DETAILED DESCRIPTION

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the invention, its application or use. All other embodiments obtained by those of ordinary skill in the art based on the embodiments of the present disclosure without creative efforts shall fall within the protection scope of the present disclosure.

The inventors have found that in the three specific implementations of Option 3, a 5G base station and a 4G base station are together responsible for a transmission of user plane data through a dual connection technology. At present, due to inconsistent progress of 4G network construction of various operators, it is generally desired to operate 4G user planes separately without sharing, or to flexibly control a degree of sharing a 4G user plane with users of other operators. Generalized to a multi-connectivity network, it may be desired by a construction operator to share a user plane of a first standard network with users of other sharing operators, while flexibly controlling a degree of sharing a user plane of a second standard network with users of other sharing operators. Therefore, a problem to be solved is how to realize a sharing of the user plane of the first standard network in a case that a sharing degree of the user plane of the second standard network is controllable.

A technical problem to be solved by the present disclosure is how to realize a flexible control of the sharing degree of the user plane of the second standard network based on a requirement, while enabling the sharing of the first standard network.

The present disclosure provides a data transmission method in a multi-connectivity network, which will be described below with reference to FIGS. 2 to 4. A user plane channel and a control plane channel in the present disclosure are logical channels, respectively referring to a resource used for transmitting user plane data and a resource for transmitting control plane information.

Figure 1:
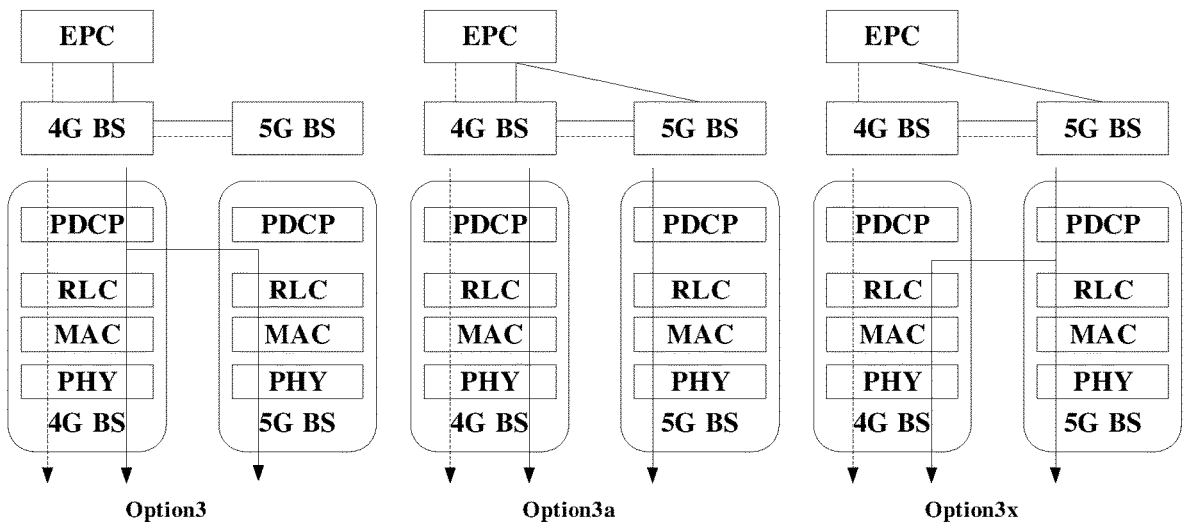
FIG. 1 shows a schematic diagram of a dual-connectivity mode of a NSA network according to some embodiments of the present disclosure.
Figure 2:
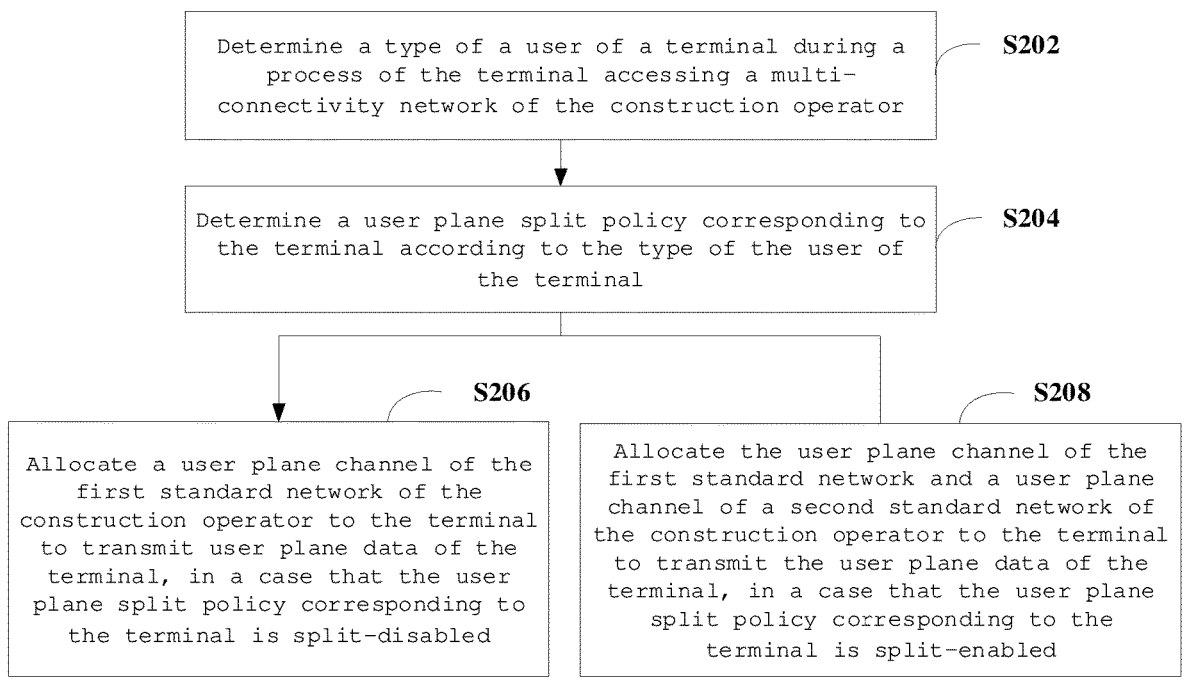
FIG. 2 shows a schematic flowchart of a data transmission method in a multi-connectivity network according to some embodiments of the present disclosure.

FIG. 2 is a flowchart of a data transmission method in a multi-connectivity network according to some embodiments of the present disclosure. As shown in FIG. 2, the method of these embodiments comprises: steps S202 to S208.

In step S202, a network device of a construction operator determines a type of a user of a terminal during a process of the terminal accessing a multi-connectivity network of the construction operator.

In a network co-constructed and sharing mode, the construction operator is an operator responsible for constructing a network in a certain region, and a sharing operator is another operator who shares part or all of the network with the construction operator. The multi-connectivity network of the construction operator that the terminal accesses comprises at least two standard networks, for example, the first standard network and the second standard network, wherein the terminal is connected to the different standard networks respectively. For example, the first standard network is a Fifth-Generation mobile network, and the second standard network is a Fourth-Generation mobile network or a Third-Generation mobile network.

For example, in a case that a networking mode comprises splitting user plane data from a base station in the second standard network or splitting user plane data from a base station in the first standard network, the network device of the construction operator is the base station in the second standard network. In a case that the networking comprises splitting user plane data from a core network of the second standard network, the network device of the construction operator is a core network device. If the first standard network is a 5G network and the second standard network is a 4G network, the network device of the construction operator of the above three cases may correspond to a specific network device in the Option3, Option3x, and Option3a scenarios, respectively.

The type of the user of the terminal comprises: a first type indicating that the user is a user of a sharing operator or a second type indicating that the user is a user of the construction operator. In some embodiments, the network device of the construction operator obtains identification information of the terminal from control plane information, in response to receiving the control plane information of the terminal; and the network device of the construction operator determines the type of the user of the terminal according to the identification information of the terminal. For example, the control plane information comprises: information in an RRC (Radio Resource Control) connection establishment process between the network device of the construction operator and the terminal; and the identification information of the terminal comprises a PLMN (Public Land Mobile Network) number of the terminal. For example, the identification information of the terminal comprises IMSI (International Mobile Subscriber Identity), which comprises a PLMN number. The control plane information may also comprise a signaling in another access procedure, such as Attach Request, etc., which is not limited to the illustrated examples.

Since operators has different PLMN numbers, operator attributes of users (the types of the users) of different terminals can be identified based on the PLMN numbers. In some embodiments, the network device of the construction operator obtains the PLMN number of the terminal through a signaling in an access procedure of the terminal. For example, in a case that the network device of the construction operator is the base station in the second standard network, the network device of the construction operator obtains the PLMN number of the terminal through the RRC connection establishment procedure with the terminal, and determines the type of the user of the terminal according to the PLMN number. The PLMN number comprises an MCC (Mobile Country Code) and an MNC (Mobile Network Code), and an operator network to which the user belongs can be determined based on the MNC. For an multi-connectivity network access procedure of the terminal and the RRC connection establishment procedure, reference can be made to the prior art, which will not be repeated here. In this solution, the type of the user of the terminal is determined by identifying the PLMN number of the terminal from the signaling of the access procedure.

In step S204, the network device of the construction operator determines a user plane split policy corresponding to the terminal according to the type of the user of the terminal.

The user plane split policy can be a user-level setting, that is, a user plane split policy is correspondingly set for a user of each terminal. The user plane split policy of the terminal may comprise: split-disabled and split-enabled. Split-disabled means that user plane data of the terminal is prohibited from being split to a network that is not shared by the construction operator with the terminal. Split-enabled means that user plane data of the terminal is allowed to be split to every network of the construction operator. In some embodiments, in a case that the user of the terminal is a user of a sharing operator, i.e., the type of the user is the first type, the network device of the construction operator determines that the user plane split policy corresponding to the terminal is split-disabled, and in a case that the user of the terminal is a user of the construction operator, i.e., the type of the user is the second type, the network device of the construction operator determines that the user plane split policy corresponding to the terminal is split-enabled.

In other embodiments, the construction operator can control a sharing degree of a user plane channel of a certain network (such as the second standard network) to a user of a sharing operator, and the sharing degree can be determined through a negotiation between the construction operator and the sharing operator. For example, the construction operator can share of user plane air interface resources of the base station in the second standard network with a sharing operator in a certain proportion. Since information of the user plane air interface resources is mainly obtained by the base station, in a case that a networking mode comprises splitting user plane data from the base station in the second standard network or splitting user plane data from a base station in the first standard network, the network device of the construction operator determines the user plane split policy corresponding to the terminal, according to the type of the user of the terminal and an occupancy rate of user plane air interface resources provided by a base station in the second standard network and occupied by all terminals, of which users are of the same type as the terminal. For Option3, Option3a, and Option3x, the above method is mainly applicable to Option3 and Option3x. The occupancy rate is a ratio of user plane air interface resources occupied by all terminals, of which users are of the same type as the terminal to all user plane air interface resources provided by the base station in the second standard network.

Furthermore, in a case that the user of the terminal is a user of the construction operator, i.e., the type of the user is the first type, the network device of the construction operator determines whether the occupancy rate of the user plane air interface resources provided by the base station in the second standard network and occupied by all terminals belonging to users of the sharing operator reaches a threshold, determines that the user plane split policy corresponding to the terminal is split-disabled, in a case that the occupancy rate reaches the threshold, and determines that the user plane split policy corresponding to the terminal is split-enabled, in a case that the occupancy rate does not reach the threshold. That is, if the user plane air interface resources of the base station in the second standard network occupied by users of the sharing operator connected to the base station in the second standard network reaches the threshold, the terminal is set to split-disabled after accessing the multi-connectivity network. In a case that the user of the terminal is a user of the construction operator, i.e., the type of the user is the second type, the network device of the construction operator determines that the user plane split policy corresponding to the terminal is split-enabled. For example, the user plane air interface resources are user plane air interface channel resources or user plane air interface path resources.

In step S206, the network device of the construction operator allocates a user plane channel of the first standard network of the construction operator to the terminal to transmit user plane data of the terminal, in a case that the user plane split policy corresponding to the terminal is split-disabled.

In step S208, the network device of the construction operator allocates the user plane channel of the first standard network and a user plane channel of a second standard network of the construction operator to the terminal to transmit the user plane data of the terminal, in a case that the user plane split policy corresponding to the terminal is split-enabled.

In some embodiments, in a case that the network device of the construction operator is a core network device, the core network device transmits the user plane split policy of the terminal to the base station in the second standard network (that is, a base station responsible for the control plane). The base station in the second standard network allocates the user plane channel of the first standard network of the construction operator to the terminal, or allocates the user plane channel of the first standard network and the user plane channel of the second standard network of the construction operator to the terminal according to the user plane split policy.

Regardless of whether the user plane split policy is split-disabled or split-enabled, the user plane data of the terminal can be transmitted through the user plane channel of the first standard network, that is, the first standard network is shared. In a case that the user plane split policy is split-disabled, the terminal is not allowed to share the second standard network, that is, the sharing degree of the second standard network can be flexibly controlled. Through the above process, user-level split control operations are performed based on the type of the user, which can achieve the sharing of the user plane of the first standard network and the flexible control of the sharing degree of the user plane of the second standard network, thereby realizing a network sharing scheme in which the first standard network can be co-constructed for sharing, and the second standard network can operate relatively independently.

In the above embodiment, the network device of the construction operator identifies whether the user of the terminal is a user of the construction operator or a user of the sharing operator during the process of the terminal accessing the multi-connectivity network of the construction operator. The network device of the construction operator determines the user plane split policy corresponding to the terminal according to the type of the user of the terminal. In a case that the user plane split policy corresponding to the terminal is split-disabled, the network device of the construction operator allocates the user plane channel of the first standard network of the construction operator to the terminal to transmit the user plane data of the terminal. In a case that the user plane split policy corresponding to the terminal is split-enabled, the network device of the construction operator allocates the user plane channel of the first standard network and the user plane channel of the second standard network of the construction operator to the terminal to transmit the user plane data of the terminal.

The above multi-connectivity network sharing scheme, in which the control plane and the user plane are controlled separately, can achieve the flexible control of the sharing degree of the user plane of the second standard network based on a requirement while enabling the sharing of the first standard network. The above method is applicable to the NSA scenario. In a case that the first standard network is a 5G network and the second standard network is a 4G network, the sharing degree of the user plane of the 4G network can be flexibly controlled according to the type of the user, while enabling sharing of the 5G network by all users. In this way, the goal of co-construction and sharing of the 5G network and relatively independent operation of the 4G network can be achieved, which can ensure the implementation of 5G network co-construction and sharing, and can reduce the cost of 5G network construction.

Figure 3:
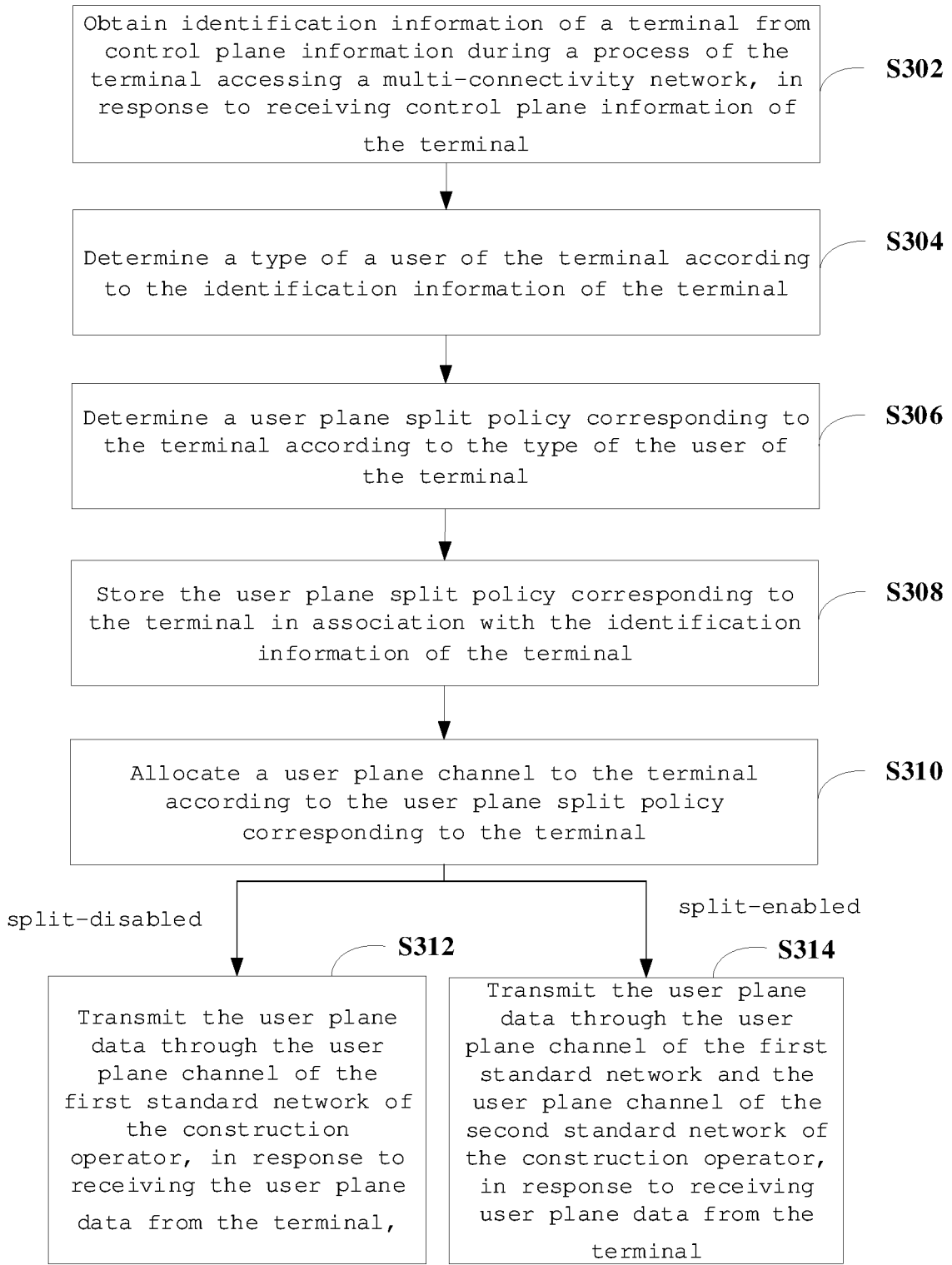
FIG. 3 shows a schematic flowchart of a data transmission method in a multi-connectivity network according to other embodiments of the present disclosure.

FIG. 3 is a flowchart of a data transmission method in a multi-connectivity network according to other embodiments of the present disclosure. As shown in FIG. 3, the method of these embodiments comprises: steps S302 to S314.

In step S302, a network device of a construction operator obtains identification information of a terminal from control plane information during a process of the terminal accessing a multi-connectivity network, in response to receiving control plane information of the terminal.

In step S304, the network device of the construction operator determines a type of a user of the terminal according to the identification information of the terminal.

The identification information of the terminal comprises, for example, a PLMN number.

In step S306, the network device of the construction operator determines a user plane split policy corresponding to the terminal according to the type of the user of the terminal.

For the details of this step, reference can be made to the foregoing embodiment.

In step S308, the network device of the construction operator stores the user plane split policy corresponding to the terminal in association with the identification information of the terminal.

The user plane split policy can be stored as an item of attribute information of the terminal in association with the identification information of the terminal. For example, the user plane split policy can be represented by a numerical value, such as "1" for split-enabled and "0" for split-disabled. Here, the identification information of the terminal refers to information that can uniquely identify the terminal.

In some embodiments, a split switch can be correspondingly provided for a user of each terminal. The network device of the construction operator sets the split switch of a user plane channel of the second standard network corresponding to the identification information of the terminal to an off state, in a case of determining that the user plane split policy corresponding to the terminal is split-disabled, and sets the split switch of the user plane channel of the second standard network corresponding to the identification information of the terminal to an on state, in a case of determining that the user plane split policy corresponding to the terminal is split-enabled. The state of the split switch can be represented by a numerical value, for example, "1" for the on state and "0" for the off state, which however is not limited to the illustrated examples. In a case that the networking mode comprises splitting the user plane data from the base station in the second standard network or splitting the user plane data from the base station in the first standard network, the split switch can be set at the base station in the second standard network; in a case that networking comprises splitting the user plane data from the core network of the second standard network, the split switch can be set at a core network device.

In step S310, the network device of the construction operator allocates a user plane channel to the terminal according to the user plane split policy corresponding to the terminal.

A user plane channel can be allocated for the terminal according to the state of the split switch. In a case that the networking mode comprises splitting the user plane data from the base station in the second standard network or splitting the user plane data from the base station in the first standard network, the network device of the construction operator may be the base station in the second standard network (a base station responsible for the control plane). In a case that the user plane split policy corresponding to the terminal is split-disabled, the base station in the second standard network allocates a user plane channel of the first standard network to the terminal, and in a case that the user plane split policy corresponding to the terminal is split-enabled, allocates a user plane channel of the first standard network and the user plane channel of the second standard network to the terminal. The procedure of allocating the user plane channel comprises interactions between the base station in the second standard network and the base station in the first standard network. For this procedure, reference can be made to the prior art, and will not be repeated here.

In a case that the networking mode comprises splitting the user plane data from the core network of the second standard network, the network device of the construction operator may be a core network device. The control device transmits the user plane split policy corresponding to the terminal to the base station in the second standard network (a base station responsible for the control plane), and the base station in the second standard network allocates the user plane channel to the terminal according to the user plane split policy corresponding to the terminal.

In step S312, the network device of the construction operator transmits the user plane data through the user plane channel of the first standard network of the construction operator, in response to receiving the user plane data from the terminal, in a case that the user plane split policy corresponding to the terminal is split-disabled.

In step S314, the network device of the construction operator transmits the user plane data through the user plane channel of the first standard network and the user plane channel of the second standard network of the construction operator, in response to receiving user plane data from the terminal, in a case where the user plane split policy corresponding to the terminal is split-enabled.

In some embodiments, the network device of the construction operator transmits control plane information of the terminal through a control plane channel of the second standard network of the construction operator, in response to receiving the control plane information from the terminal. The control plane information of all terminals can be transmitted through the control plane channel of the second standard network. The coverage of the second standard network is larger than that of the first standard network.

The solutions of the foregoing embodiments can be extended to multiple networks of different network standards. For example, the first standard network may be replaced by one or more shared networks, that is, terminals of all types of users can transmit user plane data through a user plane channel(s) of the shared network(s). The second standard network can be replaced with one or more networks with controllable sharing degrees. For a terminal, it is required to determine a user plane split policy of this terminal according to the type of the user of the terminal, or according to the type of the user of the terminal and an occupancy rate of user plane air interface resources provided by a base station in the network with a controllable sharing degree and occupied by all terminals, types of users of which are the same as that terminal, of which users are of the same type as the terminal, so as to determine whether user plane data of the terminal can be transmitted through the network with a controllable sharing degree. For the details of this scheme, reference can be made to the foregoing embodiments, which will not be repeated herein.

Taking an NSA dual-connectivity network supporting networking modes Option3, Option3a, and Option3x and constructed by combining a 4G network and a 5G network as an example, a data transmission method in a multi-connectivity network will be described below with reference to FIG. 4.

Figure 4:
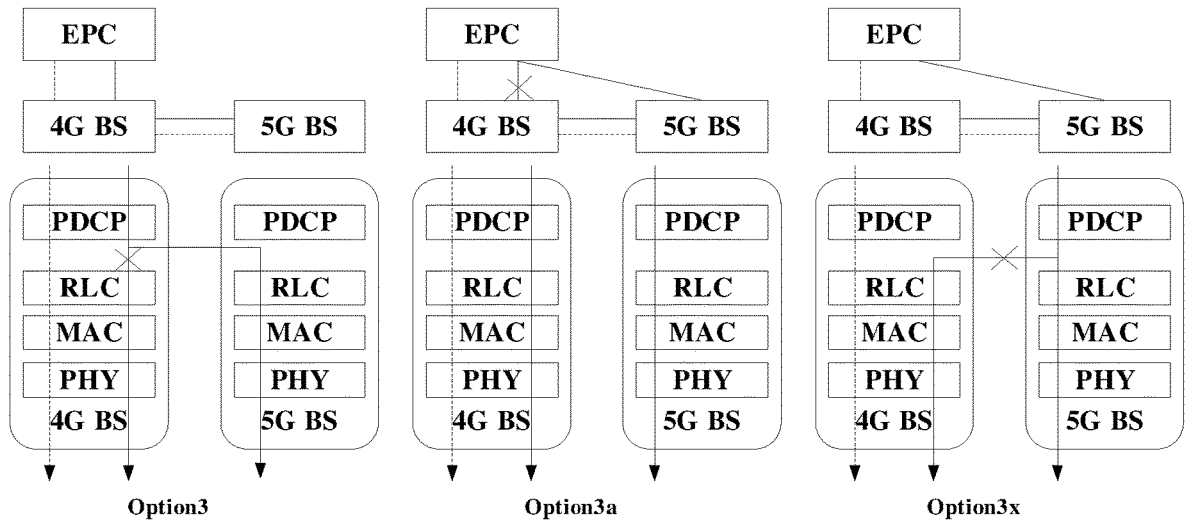
FIG. 4 shows a schematic diagram showing a change of a dual-connectivity bearer type of users of a sharing operator in an NSA dual-connectivity network environment constructed by combining a 4G network and a 5G network according to some embodiments of the present disclosure.

As shown in FIG. 4, both a 4G base station and a 5G base station are connected to an EPC (Evolved Packet Core). Protocol stacks of the 4G base station and the 5G base station comprise, for example, a PDCP layer, a RLC layer, a MAC layer, a PHY layer, etc. A transmission of control plane information is shown by dashed arrows, and a transmission of user plane data is shown by solid arrows. Due to a high cost of constructing 5G networks, it is desired to co-construct and share the 5G networks by multiple operators in different regions to save investments of the 5G networks. 5G users of various sharing operators can use the 5G networks constructed by different operators. Since operators has different PLMN numbers, for different users, an operator attribute can be still identified in a co-constructed and shared 5G network. In a network co-construction and sharing mode, for each local network, a construction operator is responsible for the construction and operation of the 5G network in that region. The data transmission method in a multi-connectivity network comprises extracting information of the PLMN number of a user, setting a user-level user plane split policy based on the PLMN number, and determining bearers of a control plane and a user plane of the user of the construction operator and bearers of the control plane and the user plane of the user of a sharing operator, etc.

When a terminal accesses a shared multi-connectivity network, a network device of the construction operator extracts a PLMN number of the terminal from a signaling in the access procedure, and identifies whether the user of the terminal is a user of the construction operator or a user of a sharing operator. The user plane split policy of the terminal can be directly determined according to the type of the user. In Option3 and Option3x, the user plane split policy of the terminal can be further determined according to an occupancy rate of user plane air interface resources provided by the 4G base station of the construction operator and occupied by all terminals of the sharing operator(s).

The user plane split policy of the terminal can be a user-level setting, which can be configured using a split switch. For any user of the construction operator, the split switch of the 4G user plane channel corresponding to the user is set to an on state, so that user plane channels of both the local 4G network and the local 5G network can be used by all 5G dual-connectivity users of the construction operator. For a user of the sharing operator, the split switch of the 4G user plane channel corresponding to this user is set to an off state, so that all 5G dual-connectivity users of the sharing operator is only allowed to use the user plane channel of the local 5G network, and cannot use the user plane channel of the local 4G network.

Or in Option3 and Option3x, for the users of the sharing operator, if the occupation rate of user plane air interface resources of the local 4G network that are occupied by the users of the sharing operator reaches a threshold, for a subsequent access user of the sharing operator, the split switch of the 4G user plane channel corresponding to this user is set to an off state, thereby the user is only allowed to use the user plane channel of the local 5G network, and cannot use the user plane channel of the local 4G network. if the occupation rate of the user plane air interface resources of the local 4G network that are occupied by the users of the sharing operator does not reach the threshold, the split switch of the 4G user plane channel corresponding to a user of the sharing operator can be set to an on state, thereby the user of the sharing operator is allowed to use the user plane channels of both the local 4G network and the local 5G network. Of course, all 5G dual-connectivity users of the sharing operator can still use the control plane channel of the local 4G network to ensure the transmission of control plane information and a normal operation of the NSA network.

In Option 3, for a user of each terminal, a state of the split switch of the 4G user plane channel can be set on a 4G base station side of the construction operator. For example, the state of the split switch of the 4G user plane channel can be set at the PDCP layer on the 4G base station side of the construction operator. In Option 3a, for a user of each terminal, a state of the split switch of the 4G user plane channel can be set on a core network side of the construction operator. In Option 3x, for a user of each terminal, a state of the split switch of the 4G user plane channel can be set on the 4G base station side of the construction operator.

For example, when a 5G user is located in a local network of a co-constructed and shared 5G network, if the user is a user of the construction operator of the local 5G network, control plane information of the user is transmitted on the local 4G network, and user plane information is transmitted on both the 4G network and the 5G network. If the user is not a user of the construction operator of the local 5G network, but is a user of a sharing operator, the control plane information of the user is transmitted on the local 4G network, and the user plane information of the user can only be transmitted on the local 5G network, or whether the user plane information can be transmitted on the local 4G network is determined according to an occupancy of air interface resources of the 4G base station. Therefore, based on the solution of the present disclosure, the goal of co-construction and sharing of the 5G network and relatively independent operation of the 4G network can be achieved.

This solution can be extended to other multi-connectivity scenarios, in which for a user of the construction operator, control plane information is transmitted in a connection channel with the best coverage, and user plane data can be transmitted in every channel of the multi-connectivity network. For a user of a sharing operator, control plane information is transmitted in a connection channel with the best coverage, and user plane data can be transmitted in a shared channel of the multi-connectivity network, and whether the user plane data can be transmitted in a non-shared channel of the multi-connectivity network can be controlled flexibly. The sharing channel and the non-sharing channel in the multi-connectivity network can be flexibly set according to a sharing degree negotiated between the operators.

The present disclosure further provides a network device in a multi-connectivity network, which will be described below with reference to FIG. 5.

Figure 5:
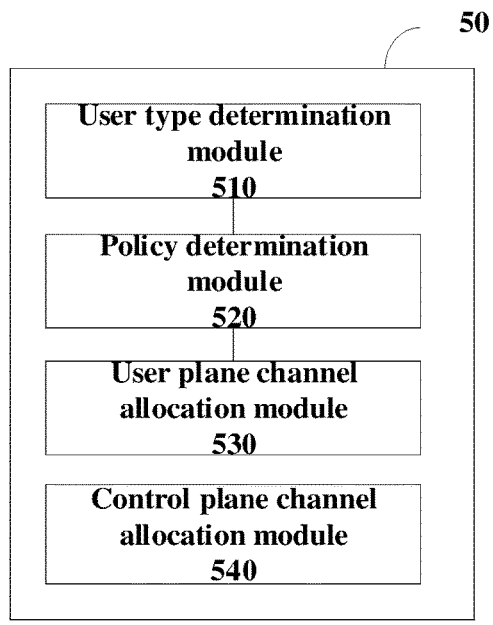
FIG. 5 shows a schematic structural diagram of a network device in a multi-connectivity network according to some embodiments of the present disclosure.

FIG. 5 is a structure diagram of a network device in a multi-connectivity network according to some embodiments of the present disclosure. As shown in FIG. 5, the device 50 of these embodiments comprises: a user type determination module 510, a policy determination module 520, and a user plane channel allocation module 530.

The user type determination module 510 is configured to determine a type of a user of a terminal during a process of the terminal accessing a multi-connectivity network of the construction operator, wherein the type comprises a first type indicating that the user is a user of a sharing operator or a second type indicating that the user is a user of the construction operator.

In some embodiments, the user type determination module 510 is configured to obtain identification information of the terminal from control plane information, in response to receiving the control plane information of the terminal; and determine the type of the user of the terminal according to the identification information of the terminal.

In some embodiments, the user type determination module 510 is configured to obtain a Public Land Mobile Network (PLMN) number of the terminal through a Radio Resource Control (RRC) connection establishment process with the terminal; and determine the type of the user of the terminal according to the PLMN number.

The policy determination module 520 is configured to determine a user plane split policy corresponding to the terminal according to the type of the user of the terminal.

In some embodiments, the policy determination module 520 is configured to the terminal is split-disabled, in a case that the user of the terminal is a user of a sharing operator and the type of the user of the terminal is the first type; and determine that the user plane split policy corresponding to the terminal is split-enabled, in a case that the type of the user of the terminal is the second type.

In some embodiments, the policy determination module 520 is configured determine the user plane split policy corresponding to the terminal, according to the type of the user of the terminal and an occupancy rate of user plane air interface resources provided by a base station in the second standard network and occupied by all terminals, of which users are of the same type as the terminal, in a case that a networking mode comprises splitting user plane data from the base station in the second standard network or splitting user plane data from a base station in the first standard network.

In some embodiments, the policy determination module 520 is configured to determine whether the occupancy rate of the user plane air interface resources provided by the base station in the second standard network and occupied by all terminals belonging to users of the sharing operator reaches a threshold, in a case that the type of the user of the terminal is the first type, determine that the user plane split policy corresponding to the terminal is split-disabled, in a case that the occupancy rate reaches the threshold, and determine that the user plane split policy corresponding to the terminal is split-enabled, in a case that the occupancy rate does not reach the threshold; and determine that the user plane split policy corresponding to the terminal is split-enabled, in a case that the type of the user of the terminal is the second type.

The user plane channel allocation module 530 is configured to allocate a user plane channel of a first standard network of the construction operator to the terminal to transmit user plane data of the terminal, in a case that the user plane split policy corresponding to the terminal is split-disabled, and allocate the user plane channel of the first standard network and a user plane channel of a second standard network of the construction operator to the terminal to transmit the user plane data of the terminal, in a case that the user plane split policy corresponding to the terminal is split-enabled.

In some embodiments, the policy determination module 520 is further configured to store the user plane split policy corresponding to the terminal in association with identification information of the terminal, after determining the user plane split policy corresponding to the terminal.

In some embodiments, the policy determination module 520 is further configured to set a split switch of a user plane channel of the second standard network corresponding to the identification information of the terminal to an off state, in a case of determining that the user plane split policy corresponding to the terminal is split-disabled; and set the split switch of the user plane channel of the second standard network corresponding to the identification information of the terminal to an on state, in a case of determining that the user plane split policy corresponding to the terminal is split-enabled.

In some embodiments, the split switch is set at a base station in the second standard network, in a case that a networking mode comprises splitting user plane data from the base station in the second standard network or splitting user plane data from a base station in the first standard network, and the split switch is set at a core network device, in a case that the networking mode comprises splitting user plane data from the core network of the second standard network.

In some embodiments, the first standard network is a Fifth-Generation mobile network, and the second standard network is a Fourth-Generation mobile network or a Third-Generation mobile network.

In some embodiments, the network device 50 further comprises: a control plane channel allocation module 540 configured to transmit control plane information of the terminal through a control plane channel of the second standard network of the construction operator.

The network device in a multi-connectivity network in the embodiments of the present disclosure may be implemented by various computing devices or computer systems, which will be described below with reference to FIGS. 6 and 7.

Figure 6:
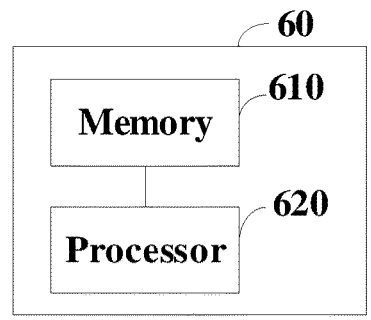
FIG. 6 shows a schematic structural diagram of a network device in a multi-connectivity network according to other embodiments of the present disclosure.

FIG. 6 is a structure diagram of a network device in a multi-connectivity network according to some embodiments of the present disclosure. As shown in FIG. 6, the network device 60 of this embodiment comprises: memory 610 and a processor 620 coupled to the memory 610, the processor 620 configured to, based on instructions stored in the memory 410, carry out the data transmission method in a multi-connectivity network according to any one of the embodiments of the present disclosure.

Wherein, the memory 610 may comprise, for example, system memory, a fixed non-volatile storage medium, or the like. The system memory stores, for example, an operating system, applications, a boot loader, a database, and other programs.

Figure 7:
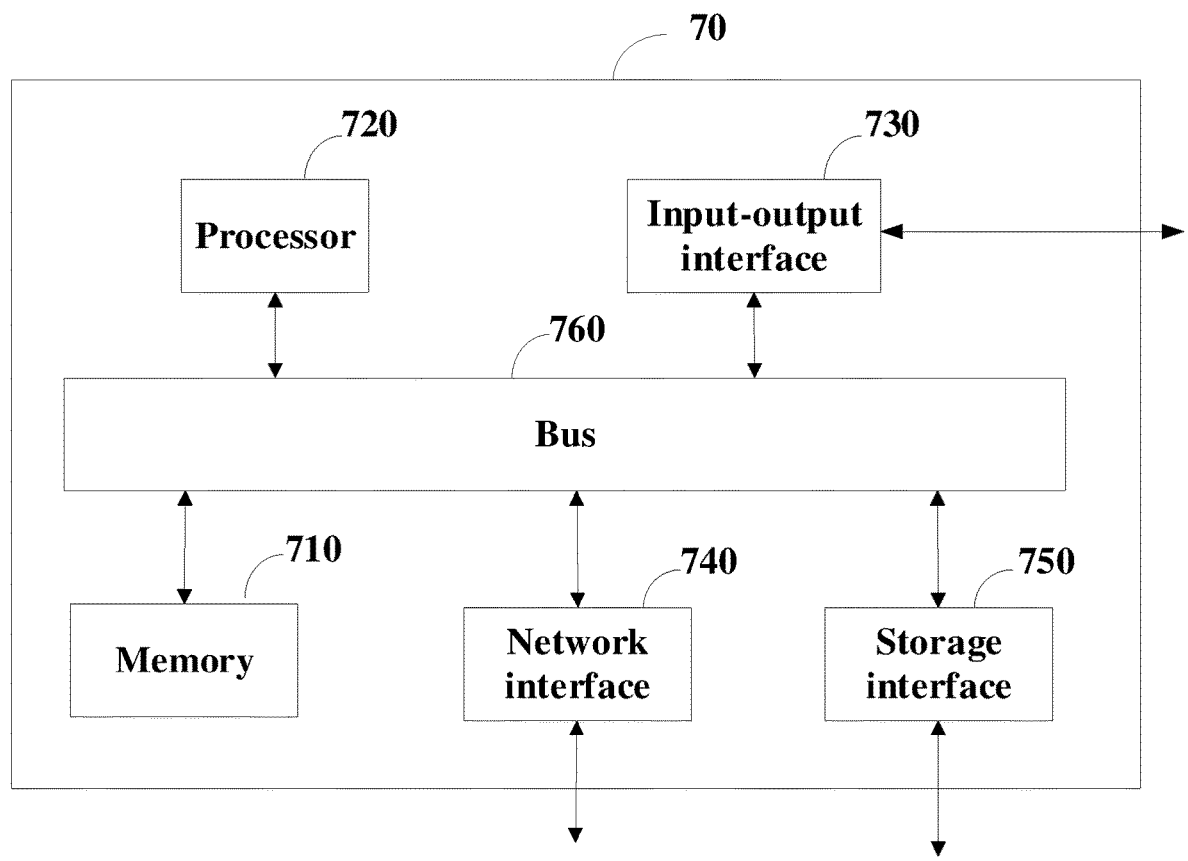
FIG. 7 shows a schematic structural diagram of a network device in a multi-connectivity network according to still other embodiments of the present disclosure.

FIG. 7 is a structure diagram of a network device in a multi-connectivity network according to other embodiments of the present disclosure. As shown in FIG. 7, the network device 70 of this embodiment comprises: a memory 710 and a processor 720 that are similar to the memory 610 and the processor 620, respectively. It may further comprise an input-output interface 730, a network interface 740, a storage interface 750, and the like. These interfaces 730, 740, 750, the memory 710 and the processor 720 may be connected through a bus 760, for example. Wherein, the input-output interface 730 provides a connection interface for input-output devices such as a display, a mouse, a keyboard, and a touch screen. The network interface 740 provides a connection interface for various networked devices, for example, it can be connected to a database server or a cloud storage server. The storage interface 750 provides a connection interface for external storage devices such as an SD card and a USB flash disk.

The present disclosure further provides a data transmission system in a multi-connectivity network, which will be described below with reference to FIG. 8.

Figure 8:
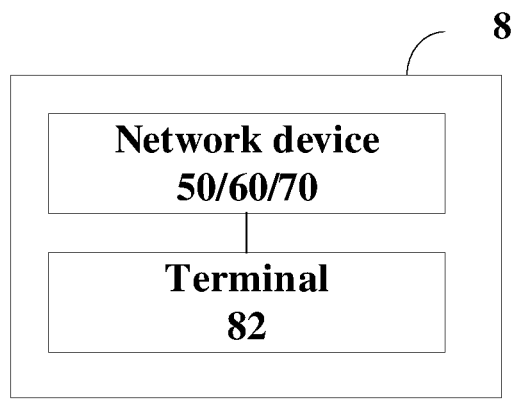
FIG. 8 shows a schematic flowchart of a data transmission system in a multi-connectivity network according to some embodiments of the present disclosure.

FIG. 8 is a structure diagram of a data transmission system in a multi-connectivity network according to some embodiments of the present disclosure. As shown in FIG. 8, the system 8 of this embodiment comprises: the network device 50/60/70 according to any one of the foregoing embodiments; and a terminal 82 configured for accessing a multi-connectivity network of a construction operator, if a user plane split policy corresponding to the terminal is split-disabled, the terminal 82 transmitting user plane data through a user plane channel of a first standard network of the construction operator, and if the user plane split policy corresponding to the terminal is split-enabled, the terminal 82 transmitting user plane data through a user plane channel of a first standard network and a user plane channel of a second standard network of the construction operator. For example, in a case where networking comprises splitting user plane data from the base station in the second standard network or splitting user plane data from the base station in the first standard network, the network device 50/60/70 is provided on the base station side of the second standard network; if networking comprises splitting user plane data from the core network of the second standard network, the network device 50/60/70 is provided on the core network device side.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical storage device, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts and/or one or more blocks of the block diagrams.

The computer program instructions may also be stored in a computer readable storage device capable of directing a computer or other programmable data processing apparatus to operate in a specific manner such that the instructions stored in the computer readable storage device produce an article of manufacture comprising instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams. The above is merely preferred embodiments of this disclosure, and is not limitation to this disclosure. Within spirit and principles of this disclosure, any modification, replacement, improvement and etc. shall be contained in the protection scope of this disclosure.

What is claimed is:

1. A data transmission method in a multi-connectivity network, performed by a network device of a construction operator, comprising:
   determining a type of a user of a terminal during a process of the terminal accessing a multi-connectivity network of the construction operator, wherein the type comprises a first type indicating that the user is a user of a sharing operator or a second type indicating that the user is a user of the construction operator;
   determining a user plane split policy corresponding to the terminal according to the type of the user of the terminal, comprising: determining the user plane split policy corresponding to the terminal, according to the type of the user of the terminal and an occupancy rate of user plane air interface resources provided by a base station in a second standard network and occupied by all terminals, of which users are of the same type as the terminal, in a case that a networking mode comprises splitting user plane data from the base station in the second standard network or splitting user plane data from a base station in a first standard network, wherein the first standard network and the second standard network are networks of different network standards; and
   allocating a user plane channel of the first standard network of the construction operator to the terminal to transmit user plane data of the terminal, in a case that the user plane split policy corresponding to the terminal is split-disabled, and allocating the user plane channel of the first standard network and a user plane channel of the second standard network of the construction operator to the terminal to transmit the user plane data of the terminal, in a case that the user plane split policy corresponding to the terminal is split-enabled.

2. The data transmission method according to claim 1, wherein determining the user plane split policy corresponding to the terminal according to the type of the user of the terminal comprises:
   determining that the user plane split policy corresponding to the terminal is split-disabled, in a case that the type of the user of the terminal is the first type; and
   determining that the user plane split policy corresponding to the terminal is split-enabled, in a case that the type of the user of the terminal is the second type.

3. The data transmission method according to claim 1, wherein determining the user plane split policy corresponding to the terminal, according to the type of the user of the terminal and the occupancy rate of the user plane air interface resources provided by the base station in the second standard network and occupied by all terminals, of which users are of the same type as the terminal comprises:
   determining whether the occupancy rate of the user plane air interface resources provided by the base station in the second standard network and occupied by all terminals belonging to users of the sharing operator reaches a threshold, in a case that the type of the user of the terminal is the first type, determining that the user plane split policy corresponding to the terminal is split-disabled, in a case that the occupancy rate reaches the threshold, and determining that the user plane split policy corresponding to the terminal is split-enabled, in a case that the occupancy rate does not reach the threshold; and
   determining that the user plane split policy corresponding to the terminal is split-enabled, in a case that the type of the user of the terminal is the second type.

4. The data transmission method according to claim 1, further comprising:
   after determining the user plane split policy corresponding to the terminal, storing the user plane split policy corresponding to the terminal in association with identification information of the terminal.

5. The data transmission method according to claim 4, wherein storing the user plane split policy corresponding to the terminal in association with the identification information of the terminal comprises:
   setting a split switch of a user plane channel of the second standard network corresponding to the identification information of the terminal to an off state, in a case of determining that the user plane split policy corresponding to the terminal is split-disabled; and
   setting the split switch of the user plane channel of the second standard network corresponding to the identification information of the terminal to an on state, in a case of determining that the user plane split policy corresponding to the terminal is split-enabled.

6. The data transmission method according to claim 1, wherein determining the type of the user of the terminal comprises:
   obtaining identification information of the terminal from control plane information, in response to receiving the control plane information of the terminal; and determining the type of the user of the terminal according to the identification information of the terminal.

7. The data transmission method according to claim 6, wherein determining the type of the user of the terminal comprises:
obtaining a Public Land Mobile Network (PLMN) number of the terminal through a Radio Resource Control (RRC) connection establishment process with the terminal; and
determining the type of the user of the terminal according to the PLMN number.

8. The data transmission method according to claim 1, further comprising:
transmitting control plane information of the terminal through a control plane channel of the second standard network of the construction operator.

9. The data transmission method according to claim 5, wherein the split switch is set at a base station in the second standard network, in a case that a networking mode comprises splitting user plane data from the base station in the second standard network or splitting user plane data from a base station in the first standard network, and the split switch is set at a core network device, in a case that the networking mode comprises splitting user plane data from the core network of the second standard network.

10. The data processing method according to claim 1, wherein the first standard network is a Fifth-Generation mobile network, and the second standard network is a Fourth-Generation mobile network or a Third-Generation mobile network.

11. A network device in a multi-connectivity network, comprising:
a processor; and
a memory coupled to the processor and storing instructions that when executed by the processor, cause the processor to:
determine a type of a user of a terminal during a process of the terminal accessing a multi-connectivity network of the construction operator, wherein the type comprises a first type indicating that the user is a user of a sharing operator or a second type indicating that the user is a user of the construction operator;
determine a user plane split policy corresponding to the terminal according to the type of the user of the terminal, comprising: determining the user plane split policy corresponding to the terminal, according to the type of the user of the terminal and an occupancy rate of user plane air interface resources provided by a base station in a second standard network and occupied by all terminals, of which users are of the same type as the terminal, in a case that a networking mode comprises splitting user plane data from the base station in the second standard network or splitting user plane data from a base station in a first standard network, wherein the first standard network and the second standard network are networks of different network standards; and
allocate a user plane channel of the first standard network of the construction operator to the terminal to transmit user plane data of the terminal, in a case that the user plane split policy corresponding to the terminal is split-disabled, and allocate the user plane channel of the first standard network and a user plane channel of the second standard network of the construction operator to the terminal to transmit the user plane data of the terminal, in a case that the user plane split policy corresponding to the terminal is split-enabled.

12. A non-transitory computer-readable storage medium storing computer programs, when executed by a processor, cause the processor to:
determine a type of a user of a terminal during a process of the terminal accessing a multi-connectivity network of the construction operator, wherein the type comprises a first type indicating that the user is a user of a sharing operator or a second type indicating that the user is a user of the construction operator;
determine a user plane split policy corresponding to the terminal according to the type of the user of the terminal, comprising: determining the user plane split policy corresponding to the terminal, according to the type of the user of the terminal and an occupancy rate of user plane air interface resources provided by a base station in a second standard network and occupied by all terminals, of which users are of the same type as the terminal, in a case that a networking mode comprises splitting user plane data from the base station in the second standard network or splitting user plane data from a base station in a first standard network, wherein the first standard network and the second standard network are networks of different network standards; and
allocate a user plane channel of a first standard network of the construction operator to the terminal to transmit user plane data of the terminal, in a case that the user plane split policy corresponding to the terminal is split-disabled, and allocate the user plane channel of the first standard network and a user plane channel of a second standard network of the construction operator to the terminal to transmit the user plane data of the terminal, in a case that the user plane split policy corresponding to the terminal is split-enabled.

13. A data transmission system in a multi-connectivity network, comprising: a network device according to claim 11; and
a terminal configured to access the multi-connectivity network of the construction operator, transmit the user plane data through the user plane channel of the first standard network of the construction operator, in a case that the user plane split policy corresponding to the terminal is split-disabled, and transmit the user plane data through the user plane channel of the first standard network and the user plane channel of the second standard network of the construction operator, in a case that the user plane split policy corresponding to the terminal is split-enabled.

14. The network device according to claim 11, wherein determining the user plane split policy corresponding to the terminal according to the type of the user of the terminal comprises:
determining that the user plane split policy corresponding to the terminal is split-disabled, in a case that the type of the user of the terminal is the first type; and
determining that the user plane split policy corresponding to the terminal is split-enabled, in a case that the type of the user of the terminal is the second type.

15. The network device according to claim 12, wherein determining the user plane split policy corresponding to the terminal, according to the type of the user of the terminal and the occupancy rate of the user plane air interface resources provided by the base station in the second standard network and occupied by all terminals, of which users are of the same type as the terminal comprises: determining whether the occupancy rate of the user plane air interface resources provided by the base station in the second standard network and occupied by all terminals belonging to users of the sharing operator reaches a threshold, in a case that the type of the user of the terminal is the first type, determining that the user plane split policy corresponding to the terminal is split-disabled, in a case that the occupancy rate reaches the threshold, and determining that the user plane split policy corresponding to the terminal is split-enabled, in a case that the occupancy rate does not reach the threshold; and determining that the user plane split policy corresponding to the terminal is split-enabled, in a case that the type of the user of the terminal is the second type.

16. The network device according to claim 11, wherein the memory further storing computer programs, when executed by a processor, cause the processor to store the user plane split policy corresponding to the terminal in association with identification information of the terminal to the memory.

17. The network device according to claim 16, wherein storing the user plane split policy corresponding to the terminal in association with identification information of the terminal to the memory comprises:
   setting a split switch of a user plane channel of the second standard network corresponding to the identification information of the terminal in the memory to an off state, in a case of determining that the user plane split policy corresponding to the terminal is split-disabled; and
   setting the split switch of the user plane channel of the second standard network corresponding to the identification information of the terminal in the memory to an on state, in a case of determining that the user plane split policy corresponding to the terminal is split-enabled.

18. The network device according to claim 11, wherein determining the type of the user of the terminal comprises:
   obtaining identification information of the terminal from control plane information, in response to receiving the control plane information of the terminal; and
   determining the type of the user of the terminal according to the identification information of the terminal.

19. The non-transitory computer-readable storage medium according to claim 12, wherein determining the user plane split policy corresponding to the terminal according to the type of the user of the terminal comprises:
   determining that the user plane split policy corresponding to the terminal is split-disabled, in a case that the type of the user of the terminal is the first type; and
   determining that the user plane split policy corresponding to the terminal is split-enabled, in a case that the type of the user of the terminal is the second type.

20. The non-transitory computer-readable storage medium according to claim 12, wherein determining the user plane split policy corresponding to the terminal, according to the type of the user of the terminal and the occupancy rate of the user plane air interface resources provided by the base station in the second standard network and occupied by all terminals, of which users are of the same type as the terminal comprises:
   determining whether the occupancy rate of the user plane air interface resources provided by the base station in the second standard network and occupied by all terminals belonging to users of the sharing operator reaches a threshold, in a case that the type of the user of the terminal is the first type, determining that the user plane split policy corresponding to the terminal is split-disabled, in a case that the occupancy rate reaches the threshold, and determining that the user plane split policy corresponding to the terminal is split-enabled, in a case that the occupancy rate does not reach the threshold; and
   determining that the user plane split policy corresponding to the terminal is split-enabled, in a case that the type of the user of the terminal is the second type.

* * * * *